INVENTORS
HENRY F. MCKENNEY
VICTOR H. SELIGER
RODNEY W. UNOLD
BY Victor N. Borst ATTORNEY ial transmission 10 is connected by shaft 11 to drive a potentiometer 12 which is connected by a pair of conductors 13 and 13' across the positive and negative terminals, respectively, of a reference voltage source 14. The variable voltage of the potentiometer 12 which is directly proportional to the displacement of the differential shaft 11 is connected to the input side of the first stage 15 of two stage servo-amplifier 16 by a conductor 17, one input and one output terminal of the first amplifier stage 15 and the conductor 13' being connected to ground potential. The output of the first amplifier stage 15 is connected to the input side of a second amplifier stage 18 of the two stage servo-amplifier 16 by a conductor 19. The output side of the second amplifier stage 18 is connected to a servomotor 20 by a conductor 21, one input and one output terminal of the second amplifier stage 18 and one terminal of the motor 20 being connected to a ground potential. The shaft of the motor 20 drives the shaft 3 and the output device 4 connected thereto.

United States Patent Office 2,913,649
Patented Nov. 17, 1959

2,913,649
STABILIZED SERVOSYSTEM

Henry F. McKenney, Rochester, Mich., Victor H. Seliger, Forest Hills, N.Y., and Rodney W. Unold, Fort Lee, N.J., assignors to Sperry Rand Corporation, Ford Instrument Company Division, Long Island City, N.Y., a corporation of New York Application April 15, 1957, Serial No. 653,029

5 Claims. (Cl. 318—32)

This invention relates to servo mechanism systems and more particularly to improved circuit means for promoting servomechanism system stability through feedback of the speed signal generated by the servomotor.

Conventional systems for promoting servomechanism stability by servomotor damping techniques include mechanical arrangements employing rate generators, magnetic drag or viscous friction mechanism and electrical bridge type networks. Such conventional stabilization arrangements normally require bulky, heavy and complex components which preclude their use in miniaturized and airborne applications.

A principal object of this invention is to provide simple and light weight circuit means for improving the stability of servomechanism systems.

The invention is preferably embodied in a closed servomechanism loop system and resides in a resistive adding network for speed signal feedback means. As contemplated there is provided a three terminal resistive adding network having its input terminals connected to the input and ouput, respectively, of the final stage of a two stage servoamplifier, the amplifier driving a servomotor in a closed loop system. The output of the adding network is connected to the input of the first stage of the amplifier. When the servo-system is energized by an error signal, the voltage appearing across the input terminals of the servomotor has components of the amplified error signal voltage, a speed voltage proportional to the speed of the servomotor, and noise voltages. Normally the noise voltages are assumed to be negligible. The resistive adding network in the proposed circuitry is adjusted so that cancellation of the signal voltage occurs without removing the speed signal at an intermediate point in the resistor network. For the desired cancellation of the signal voltage at the intermediate resistor network point, the 180° phase shift of the final servoamplifier stage is employed in the additive circuit. Having a potential which is proportional to only the speed voltage of the servomotor, this intermediate point in the resistive network is connected to partially control the input of the prior stage of the servo-amplifier. The resulting modification of the error signal promotes damping of the servomotor and thereby improves system stabilization.

The features of the invention will be understood more clearly from the following detailed description taken in conjunction with the accompanying drawing in which.

Figure 1:
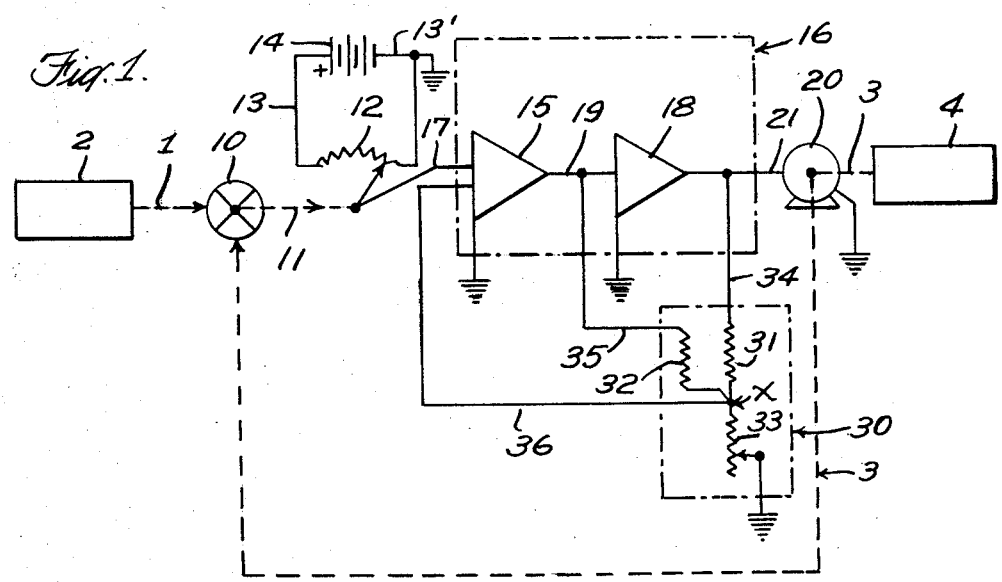
Figure 1 is a schematic diagram of a mechanical servomechanism position system employing an adding resistor network for stabilization.

Referring to the stabilized system of Figure 1 in which a mechanical displacement of shaft 1 by a driving device 2 results in a corresponding mechanical displacement of an output shaft 3 connected to a driven device 4, 10 represents a differential transmission having one input gear connected to the shaft 1 and its other input gear connected to the output shaft 3. The spider of the differential transmission 10 is connected by shaft 11 to drive a potentiometer 12 which is connected by a pair of conductors 13 and 13' across the positive and negative terminals, respectively, of a reference voltage source 14. The variable voltage of the potentiometer 12 which is directly proportional to the displacement of the differential shaft 11 is connected to the input side of the first stage 15 of two stage servo-amplifier 16 by a conductor 17, one input and one output terminal of the first amplifier stage 15 and the conductor 13' being connected to ground potential. The output of the first amplifier stage 15 is connected to the input side of a second amplifier stage 18 of the two stage servo-amplifier 16 by a conductor 19. The output side of the second amplifier stage 18 is connected to a servomotor 20 by a conductor 21, one input and one output terminal of the second amplifier stage 18 and one terminal of the motor 20 being connected to a ground potential. The shaft of the motor 20 drives the shaft 3 and the output device 4 connected thereto.

A stabilization resistive adding network 30 has three resistors 31, 32 and 33 connected to a common junction point X, the resistor 33 being variable. The other terminals of resistors 31 and 32 are connected to the output conductor 21 and the input conductor 19 of the second amplifier stage 18 by conductors 34 and 35, respectively, while the other conductor of the variable resistor 33 is grounded. The common junction point X of all three resistors is connected by a conductor 36 to the input side of the first amplifier stage 15 so as to modify the error signal being transmitted in the conductor 17. Assuming that the error signal voltage at one instant makes conductor 19 positive relative to ground potential, the current flowing in the conductor 35, the resistor 32 and the resistor 33 will be from conductor 19 to ground. Due to the 180° reversal of the final amplifier stage 18, the error signal voltage in the conductor 21 will be negative relative to ground potential and current will flow from ground through resistors 33 and 31 to the conductor 21. Under the imposed condition of the motor 20 being stationary, the voltage drops of the oppositely directed currents in the resistor 33 can be made to cancel each other out with preselected values of the resistors 31 and 32. When the motor 20 is running, the speed counter E.M.F. developed in the motor will cause a differential current to flow in resistors 31 and 33 and, as a result, the potential of point X will vary in direct proportion to the rotational speed of the motor shaft. The constant of proportionality being determined by resistor 33. By such a circuit arrangement, the speed signal of the motor 20 feeds back and modifies the error signal input to the first amplifier stage 15 for the desired damping and stabilizing influence on the system.

Figure 2:
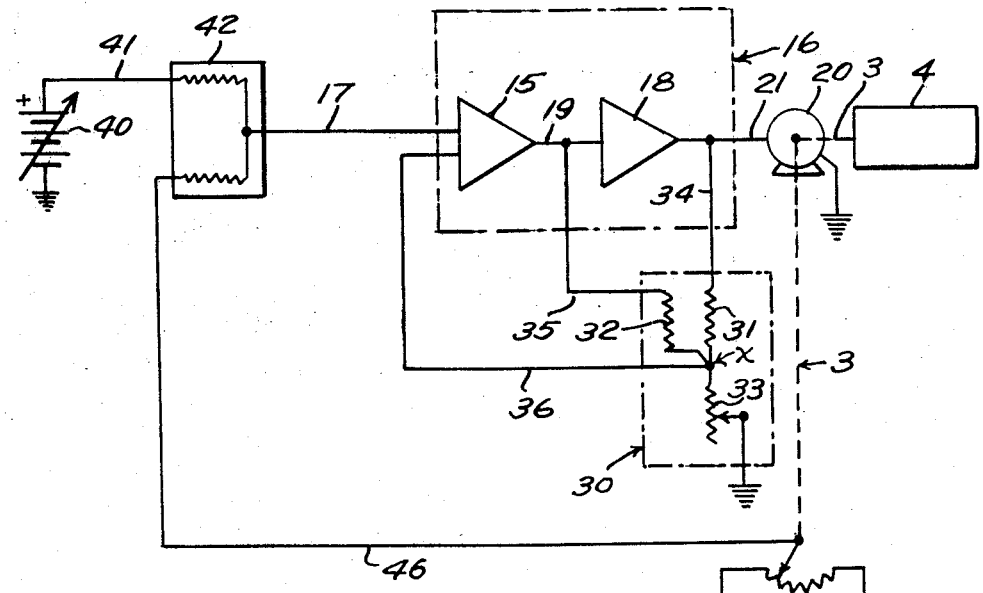
Figure 2 is a schematic diagram of a voltage actuating servomechanism position system employing an adding resistor network for stabilization.

In Fig. 2 a stabilized servomechanism system is disclosed which is responsive to control signals from a variable D.C. voltage source 40. The positive terminal of D.C. source 40 is connected by a conductor 41 to one input side of a differential resistance network 42 and the negative terminal of the source 40 is connected to a ground potential. For this embodiment of the invention, shaft 3 will displace in direct proportion to the voltage of the source 40. In order to simplify the understanding of the embodiments of the invention, like reference numbers will be used to identify corresponding elements in the figures. Shaft 3 also drives a potentiometer 43 which is connected across the positive and negative terminals of a reference D.C. voltage source 44 by conductors 45 and 45', respectively, conductor 45' being connected to a ground potential. The positive voltage output of potentiometer 43 is directly proportional to the displacement of the shaft 3 and this voltage is impressed upon the second input of the differential resistance network 42 by a conductor 46. The differential output of network 42 is connected by the conductor 17 to the input side of the first amplifier stage 15. The adding network 30 is connected in the manner of Figure 1 and the speed signal in the conductor 36 will modify the error signal being transmitted in the conductor 17 at the input side of the first amplifier stage 15. In other embodiments of the invenion the voltage sources 40 and 44 can be A.C. voltage sources.

It is to be understood that various modifications of the invention other than those above described may be effected by persons skilled in the art without departing from the principle and scope of the invention as defined in the appended claims.

What is claimed is:

1. A servo mechanism of the character described comprising a servo motor, a differential mechanism, a two stage servo amplifier interposed between said differential mechanism and said servo motor; said differential mechanism having a first input means through which an input signal is imparted to said differential mechanism; a second input means through which a feed back signal is imparted to said differential mechanism from said servo motor, and an output means through which the output of said differential mechanism is imparted to the first stage of said amplifier; a conductor through which the output of said first stage is imparted to the second stage of said amplifier; a second conductor through which the output of said second stage is imparted to said servo motor; and a stabilization resistive network comprising a first fixed resistor, a second fixed resistor, and a variable resistor, one terminal of each of said resistors being connected to a common junction, the other terminal of said first fixed resistor being connected to said conductor between said first and second amplifier stages, the other terminal of said second fixed resistor being connected to said second conductor between said second stage and said servo motor, the other terminal of said variable resistor being connected to the ground, and said common junction being connected to the input side of said first amplifier stage; and a means connecting said servo motor to ground.

2. A servo mechanism of the character described comprising a servo motor, a potentiometer, a two stage servo amplifier interposed between said potentiometer and said servo motor; a differential mechanism having a first input gear through which an input signal is imparted to said differential mechanism, a second input gear through which a feed back signal from said servo motor is imparted to said differential mechanism, and an output shaft connected to said potentiometer by which the output voltage of said potentiometer is varied in direct proportion to the displacement of said output shaft; and a stabilization resistive network; a conductor through which the output voltage of said potentiometer is imparted to the first stage of said amplifier, a second conductor through which the output of said first stage is imparted to the second stage of said amplifier, and a third conductor through which the output of said second stage is imparted to said servo motor; said stabilization resistive network comprising a first fixed resistor, a second fixed resistor, and a variable resistor, one terminal of each of said resistors being connected to a common junction, the other terminal of said first fixed resistor being connected to said second conductor between said firs and second amplifier stages, the other terminal of said second fixed resistor being connected to said third conductor between said second stage and said servo motor, the other terminal of said variable resistor being connected to the ground, and said common junction being connected to the input side of said first amplifier stage; and means connecting said first amplifier stage, said second amplifier stage, and said servo motor to the ground.

3. A servo mechanism as defined by claim 1 in which said differential mechanism comprises a resistance network having a first resistor to the input end of which an input signal is imparted, and a second resistor to the input end of which is connected a feed back means through which a feed back signal from said servo motor is imparted to said second resistor, and in which the output ends of said resistors are connected together and to said output means through which the output of said differential mechanism is imparted to the first stage of said amplifier.

4. A servo mechanism as defined by claim 3 in which said feed back means includes a potentiometer which is actuated by said servo motor to vary the output voltage thereof.

5. A servo mechanism of the character described comprising a differential mechanism, a servo motor, and a two stage servo amplifier interposed between said differential mechanism and said servo motor; said differential mechanism comprising a first input gear through which an input signal is imparted to said differential mechanism, a second input gear through which a feed back signal from said servo motor is imparted to said differential mechanism, and an output shaft which is operative to effect the imparting of a voltage to the first stage of said servo amplifier which is directly proportional to the displacement of said output shaft; a conductor through which said voltage is imparted to the first stage of said amplifier, a second conductor through which the output of said first stage is imparted to the second stage of said amplifier, and a third conductor through which the output of said second stage is imparted to said servo motor; and a stabilization resistive network which comprises a first fixed resistor, a second fixed resistor, and a variable resistor, one terminal of each of said resistors being connected to a common junction, the other terminal of said first fixed resistor being connected to said second conductor between said first and second amplifier stages, the other terminal of said second fixed resistor being connected to said third conductor between said second stage and said servo motor, the other terminal of said variable resistor being connected to the ground, and said common junction being connected to the input side of said first amplifier stage; and means connecting said first amplifier stage, said second amplifier stage, and said servo motor to the ground.

References Cited in the file of this patent
UNITED STATES PATENTS
2,786,973    Kutzler  ---------------- Mar. 26, 1957